United States Patent
Hester et al.

(10) Patent No.: US 6,986,428 B2
(45) Date of Patent: Jan. 17, 2006

(54) FLUID SEPARATION MEMBRANE MODULE

(75) Inventors: Jonathan F. Hester, Hudson, WI (US); Brian E. Spiewak, Inver Grove Heights, MN (US); Philip D. Radovanovic, Duesseldorf (DE); Stefan R. Reimann, Cologne (DE); Robert S. Kody, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 93 days.

(21) Appl. No.: 10/438,090

(22) Filed: May 14, 2003

(65) Prior Publication Data

US 2004/0226886 A1 Nov. 18, 2004

(51) Int. Cl.
*B01D 29/07* (2006.01)
(52) U.S. Cl. .................. 210/488; 210/486; 210/314; 210/316; 210/321.6; 210/321.75; 210/321.84; 55/497; 55/498; 55/520
(58) Field of Classification Search .................. 55/497, 55/498, 520; 210/498, 486, 316, 314, 321.61, 210/488, 321.84, 321.75
See application file for complete search history.

(56) References Cited

U.S. PATENT DOCUMENTS

| | | | |
|---|---|---|---|
| 3,472,765 A | 10/1969 | Budd et al. | |
| 3,679,059 A | 7/1972 | Wyatt et al. | |
| 4,053,418 A | 10/1977 | Newman | |
| 4,264,447 A | 4/1981 | Nicolet | |
| 4,333,779 A | 6/1982 | Rinker et al. | |
| 4,416,993 A | 11/1983 | McKeown | |
| 4,539,256 A | 9/1985 | Shipman | |
| 4,701,234 A | 10/1987 | Rogemont et al. | |
| 4,834,881 A * | 5/1989 | Sawada et al. | 210/321.74 |
| 4,869,821 A | 9/1989 | Korin | |
| 4,871,456 A | 10/1989 | Naruo et al. | |
| 5,015,379 A * | 5/1991 | Drori | 210/411 |
| 5,069,403 A | 12/1991 | Marentic et al. | |
| 5,071,553 A | 12/1991 | Newlin | |
| 5,192,456 A | 3/1993 | Ishida et al. | |
| 5,248,424 A | 9/1993 | Cote et al. | |
| 5,254,143 A | 10/1993 | Anazawa et al. | |
| 5,437,651 A | 8/1995 | Todd et al. | |
| 5,482,625 A | 1/1996 | Shimizu et al. | |
| 5,514,120 A | 5/1996 | Johnston et al. | |
| 5,626,751 A | 5/1997 | Kikuchi et al. | |
| 5,639,373 A | 6/1997 | Mahendran et al. | |
| 5,651,888 A | 7/1997 | Shimizu et al. | |
| 5,651,889 A | 7/1997 | Wataya et al. | |
| 5,772,831 A | 6/1998 | Moro et al. | |

(Continued)

FOREIGN PATENT DOCUMENTS

EP 0 197 024 A1 10/1986

(Continued)

*Primary Examiner*—W. L. Walker
*Assistant Examiner*—K S Menon
(74) *Attorney, Agent, or Firm*—Douglas B. Little

(57) ABSTRACT

The present invention includes a membrane construction for selectively transferring a constituent to or from a fluid. The membrane construction includes a multi-layer fluid impermeable support sheet having a plurality of supports on at least one side of the support sheet that form a plurality of flow channels. At least one layer of the multi-layer support sheet is a bonding layer. A fluid permeable layer extends over the flow channels and is bonded to the plurality of the supports by the bonding layer.

20 Claims, 3 Drawing Sheets

U.S. PATENT DOCUMENTS

| | | |
|---|---|---|
| 5,858,283 A | 1/1999 | Burris |
| 6,280,824 B1 | 8/2001 | Insley et al. |
| 6,287,467 B1 | 9/2001 | Nagano et al. |
| 6,290,685 B1 | 9/2001 | Insley et al. |
| 6,322,703 B1 | 11/2001 | Taniguchi et al. |
| 6,514,412 B1 | 2/2003 | Insley et al. |
| 6,558,549 B2 | 5/2003 | Cote et al. |
| 6,589,317 B2 | 7/2003 | Zhang et al. |
| 2002/0027101 A1 | 3/2002 | Insley et al. |
| 2002/0162784 A1 | 11/2002 | Kohlheb et al. |

FOREIGN PATENT DOCUMENTS

| | | |
|---|---|---|
| EP | 0 443 642 A2 | 8/1991 |
| EP | 0 602 560 B1 | 6/1994 |
| EP | 0 653 240 A1 | 5/1995 |
| EP | 1 142 702 A1 | 10/2001 |
| WO | WO 98/01219 | 1/1998 |
| WO | WO 99/65664 | 12/1999 |
| WO | WO 03/037489 A1 | 5/2003 |
| WO | WO 03/051782 A1 | 6/2003 |

\* cited by examiner

FLUID SEPARATION MEMBRANE MODULE

TECHNICAL FIELD

The present invention generally relates to a membrane construction for selectively transferring a constituent to or from a fluid. More specifically, the present invention relates to a membrane construction useful in membrane bioreactors (MBRs), membrane aeration bioreactors (MABRs), and other filtration and mass transfer apparatus.

BACKGROUND

In U.S. Pat. No. 3,472,765 use of a membrane separation device in a biological reactor is described for removing one or more constituents from a fluid mixture by passing a fluid mixture through a selectively permeable fluid separation medium that is a component of the separation device. Fluid membrane devices include membrane modules that generally fall under three membrane categories: tubular, hollow fiber, and flat sheet porous membranes. Techniques described in the art that are suitable for manufacturing membrane modules are disclosed in U.S. Pat. No. 6,284,137-B1, U.S. Pat. No. 4,230,463, and U.S. Pat. No. 3,615,024.

Flat sheet porous membranes that are included as part of plate-and-frame modules along with hollow fiber membrane modules are membrane types used to process water and wastewater. Porous hollow fiber membrane modules and methods of making them are described in European Patent Publication 1,166,859-A2, U.S. Pat. App. 2002/0011443-A1, U.S. Pat. No. 4,440,641; U.S. Pat. No. 4,886,601; U.S. Pat. No. 6,325,928; U.S. Pat. No. 5,783,083; U.S. Pat. No. 5,639,373, U.S. Pat. No. 5,248,424, U.S. Pat. No. 5,922,201, and U.S. Pat. No. 5,914,039.

Flat sheet porous membrane modules are described in U.S. Pat. No. 5,651,889, and European Pat. Publication 1,127,849-A1. Flat sheet porous membrane modules can be assembled in pleated cartridges, spirally-wound modules, or plate-and-frame configurations. Plate-and-frame flat sheet membrane modules are typically easier to clean than other types of membrane modules.

Support layers may be used to keep a space between two flat-sheet membranes to provide for conveyance of fluid to or from the space between the membranes via a manifold connected to the flat-sheet membrane modules. Support layers may be in the form of a permeable mesh designed to keep the membrane module from collapsing under any internal vacuum or external pressure. Alternatively, support layers can be in the form of a paper mesh, a non-woven or a woven-fiber based material. Some examples of support layers are disclosed in U.S. Pat. No. 4,701,234, U.S. Pat. Nos. 3,679,059, 4,871,456, 4,264,447, and European Pat. No. 0,602,560-B1.

Plate-and-frame module designs may include a support plate rather than a support mesh to provide strength and rigidity to membrane modules. European Pat. No. 0,602,560-B1 discloses a structured support plate that contains a mesh of grooves cut into the support plate to enhance fluid transfer. U.S. Pat. No. 5,626,751 describes a module support plate made of metal. Other support plate designs are found in U.S. Pat. No. 5,482,625 and PCT Publication WO 99/65595.

Attachment of the support layer to the membrane layer can be accomplished by an adhesive, such as disclosed in U.S. Pat. No. 5,071,553, European Pat. No. 0,653,240-A1, U.S. Pat. No. 5,772,831, or by melting the membrane, the support plate or both using thermal fusion or ultrasonic waves, such as disclosed in European Pat. No. 0,602,560-B1, U.S. Pat. No. 5,482,625, U.S. Pat. No. 5,651,888, U.S. Pat. No. 4,701,234, U.S. Pat. No. 6,287,467-B1, U.S. Pat. No. 4,264,447, and U.S. Pat. No. 4,302,270.

DISCLOSURE OF INVENTION

The present invention includes a membrane construction for selectively transferring a constituent to or from a fluid. The membrane construction includes a multi-layer fluid impermeable support sheet having a plurality of supports on at least one side of the support sheet that form a plurality of flow channels. At least one layer of the multi-layer support sheet is a bonding layer. A fluid permeable layer extends over the flow channels and is bonded to the plurality of the supports by the bonding layer. The present invention further includes methods of using the membrane construction.

DETAILED DESCRIPTION

The present invention includes a membrane construction having a multi-layer fluid impermeable support sheet with a plurality of supports on at least one side of the support sheet that form a plurality of flow channels. At least one fluid permeable layer covers the flow channels and is bonded to the supports by a bonding layer.

As used herein, the term "microporous" refers to porous films, membranes or film layers having an average pore size of 0.05 to 3.0 microns as measured by bubble point pore size ASTM-F-316-80.

As used herein, the term "ultraporous" refers to films, membranes or film layers having an average pore size of 0.001 to 0.05 microns as measured by bubble point pore size test ASTM-F-316-80.

As used herein, the term "membrane construction" means having a membrane on a support such that the membrane permits selective transport of at least one constituent of a fluid mixture through the membrane while selectively precluding transport of other constituents.

As used herein, the term "porous membrane" refers to a membrane having a multiplicity of pores or holes which permit selective transport of at least one constituent of a fluid mixture through the structure while selectively precluding transport of other constituent(s).

As used herein, the term "water-impermeable" means being impermeable to liquid water under conditions of standard temperature and pressure.

As used herein, the term "corrugated" means having a shape of folds or parallel and alternating ridges and grooves.

As used herein, the term "extremities of the corrugations" refers to the tips of a saw-tooth or curve of a sinusoidal corrugated profile of a support layer.

As used herein, the term "undulated" means having a wavelike form or appearance.

As used herein, the term "softening temperature" refers to the temperature at or above which a polymer component alone or in a blend with a diluent component will soften.

As used herein, the term "moisture vapor permeable" is used to describe microporous membrane materials which readily permit the passage of water vapor through the membrane material but which do not readily allow the passage of liquid water.

As used herein, the term "hydrophilic" means having a strong tendency to bind to or absorb water.

As used herein, the term "hydrophobic" is used to describe microporous membrane materials which are not wet by liquid water, polar or aqueous solvents, and which are capable of repelling and preventing the passage of liquid water through the membrane.

As used herein, the term "oleophobic" is used to describe microporous membrane materials that are not wet by low surface energy fluids like oils, greases or hydrocarbon solvents. The term "oleophobic" is also meant to include repelling or tending to not combine with oil or grease.

Figure 1:
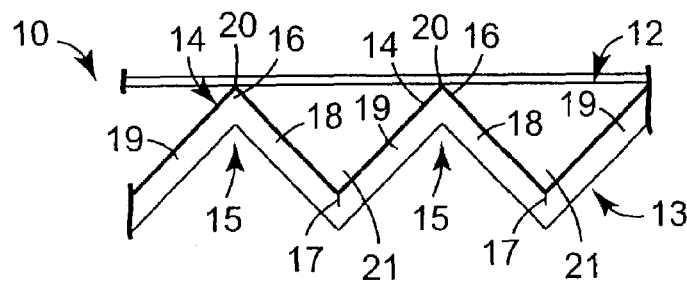
FIG. 1 is a partial cross-section of a membrane construction in accordance with the present invention.

A membrane construction 10 in accordance with the present invention is generally depicted in FIG. 1. The membrane construction 10 includes a fluid permeable layer 12 bonded by a bonding layer 14 to a multi-layer fluid impermeable support sheet 13 in the form of a corrugated sheet. The corrugated sheet includes a plurality of substantially parallel folds 15. The folds are defined by alternating ridges 16 and grooves 17 with each ridge 16 and groove 17 being defined by conjoining wall sections 18, 19 that are disposed at angles (which may be acute) with respect to each other.

The permeable layer 12 is bonded to ridges 16 by bonding layer 14. Bonding layer 14 may extend along an entire surface of the support sheet 13 or may be positioned at ridge 16. Bonding layer 14 bonds tips 20 of ridges 16 to the permeable layer 12 and forms a substantially continuous seal along the length of tips 20.

The substantially continuous seals along two adjacent ridges with two adjacent wall sections and the permeable layer 12 form a flow channel 21 that is discrete and separate from adjacent flow channels 21. The bonding of the permeable layer 12 along substantially all of the ridges 16 in a substantially continuous sealing relationship localizes to that particular flow channel 21 any rupture that may occur to the permeable layer 12 thereby preventing flooding of the entire membrane construction 10.

An alternative membrane construction 22 includes first and second permeable layers 23a and 23b bonded to both sides of a multi-layer fluid impermeable support sheet 24. The permeable layer support sheet 24 is similar to the support sheet 13 in that is it is in the form of a corrugated sheet, but the support sheet 24 has bonding layers 25a and 25b on both sides of the sheet 24. The sheet 24 also has ridges 26a which are positioned proximate (adjacent to) the permeable layer 23a and ridges 26b which are positioned proximate (adjacent to) the permeable layer 23b. The support sheet 24 also includes grooves 27a positioned proximate the permeable layer 23a while grooves 27b are positioned proximate the permeable layer 23b. Conjoining wall sections 28 and 29 which are disposed at angles (which may be acute) with respect to each other define the ridges 26a and 26b and grooves 27a and 27b.

Similar to the construction described with respect to FIG. 1, the permeable layers 23a and 23b are bonded to tips 30a of the ridges 26a and to tips 30b of the ridges 26b, respectively. The bonding is accomplished through bonding layers 25a and 25b. The bonding layers 25a and 25b may extend along the entire surface of the impermeable support sheet 24 or may be disposed at the tips 30a and 30b of the ridges 26a and 26b, respectively.

The bond between the tips 30a and 30b and the permeable layer 23a and 23b, respectively, extends substantially continuously along the length of each respective ridge. The substantially continuous seal along two adjacent ridges, whether it is ridges 26a or ridges 26b, along with two adjacent wall sections, 28, 29, form flow channels 31a and 31b, respectively. Each flow channel is discrete from adjacent flow channels. The substantially continuous sealing relationship along the ridges 26a and 26b localizes ruptures to the particular flow channel that may occur to the permeable layers 23a and 23b thereby preventing flooding of the entire membrane construction 22.

Figure 3:
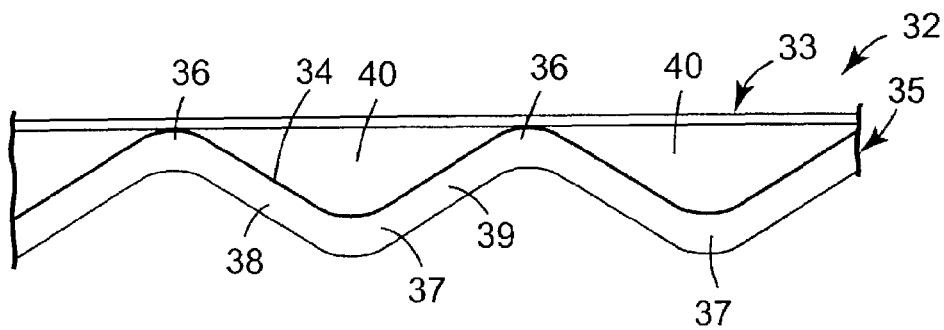
FIG. 3 is a partial cross-section of another embodiment of the inventive membrane construction in the form of a sinusoidal configuration.

Similarly, another membrane construction generally indicated at 32 in FIG. 3 includes a fluid permeable layer 33 bonded by a bonding layer 34 to a support sheet 35. The support sheet 35 is in a form of a sinusoidal curve having ridges 36 and grooves 37. The bonding layer 34 may extend along the entire surface of the sheet 35 but may be positioned at ridge 36 to provide a bond between the permeable layer 33 and the support sheet 35. Located between adjacent ridges 36 and grooves 37 are wall sections 38 and 39. The wall sections 38 and 39 along with the permeable layer 33 form discrete flow channels 40. The bonding of the membrane 42 to the support sheet 35 is a substantially continuous seal along substantially the entire length of the ridges 36. This substantially continuous seal localizes to the particular flow channel 40 ruptures that may occur to the permeable layer thereby preventing flooding of the entire membrane construction 32.

Figure 2:
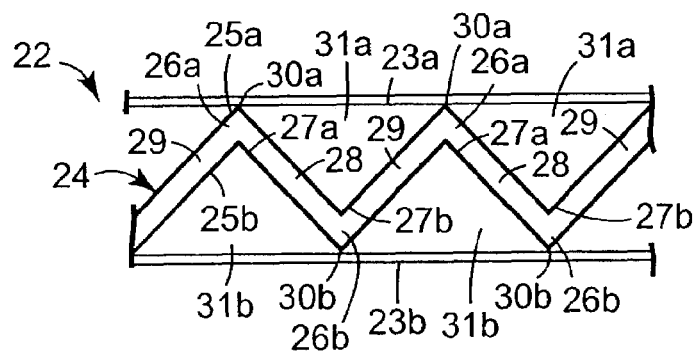
FIG. 2 is a partial cross-section of an alternate embodiment of the inventive membrane construction in the form of a corrugated sheet that includes fluid permeable layers on both sides of the corrugated sheet.
Figure 4:
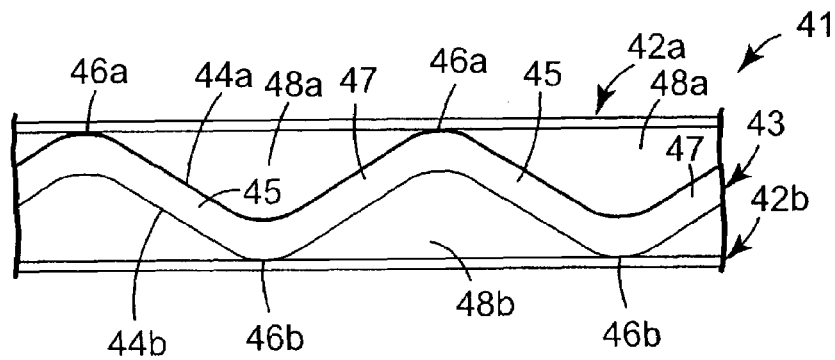
FIG. 4 is a partial cross-section of an alternate embodiment of the inventive membrane construction in the form of a sinusoidal configured sheet that includes fluid permeable layers on both sides of the sheet.

Similar to the corrugated construction described with respect to FIG. 2, a sinusoidal construction of the support sheet 43 has permeable layers 42a and 42b bonded to the support sheet 43 on opposite sides thereof along ridges 46a and 46b by bonding layers 44a and 44b as illustrated in FIG. 4. The bonding layers 44a and 44b may extend along both surfaces of the support sheet 43 but may be placed on the ridges so that the permeable layers 42a and 42b may be bonded to the support sheet 43. Discrete flow channels 48a and 48b are defined by wall sections 45, 47 of the sinusoidal curved support sheet 43 and the permeable layers 42a and 42b in a manner similar to the construction illustrated in FIG. 2.

Figure 5A:
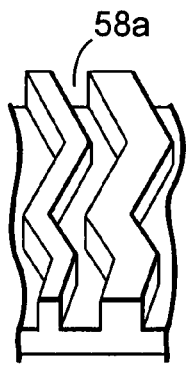
FIGS. 5a–c are perspective views of multi-layer support sheets that illustrate flow channels having tortuous flow paths.
Figure 5B:
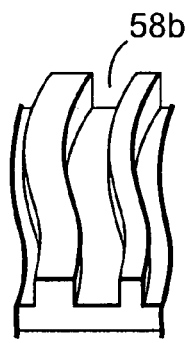
Figure 5C:
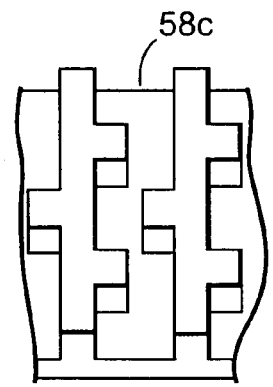

Although flow channels 21, 31a, 31b, 40, 42a and 42b have been described as extending along the entire length of the support sheets 13, 24, 35, 43, respectively, the flow channels 21, 31a, 31b, 40, 42a and 42b need not extend along the entire length of the support sheets. Additionally, while the flow channels 21, 31a, 31b, 40, 42a and 42b are described as linear, alternative shapes, sizes or configurations of the flow channels are permissible as long as the fluid permeable layers 12, 22, 32, and 42 are bonded along the ridges to form discrete flow channels. For example, the multi-layer support sheet can be formed to make a tortuous flow channel such as illustrated in FIG. 5a in a zig-zag configuration, as illustrated in FIG. 5b in a curved configuration or as illustrated in FIG. 5c in a maze configuration.

The fluid permeable layer is generally ultraporous or microporous with pore sizes that may range from about 0.001 micrometers to about 3.0 micrometers. Preferably, the pore size of the fluid permeable layer is less than about 0.8 micrometers. The preferred pore size prevents microbes in wastewater from permeating and growing in the fluid permeable layer.

The fluid permeable layer may be hydrophilic or hydrophobic depending on requirements of separation, such as gas-solid, gas-liquid, liquid-solid, or liquid-liquid separation requirements. Some non-exhaustive examples of materials that may be used as part of the fluid permeable layer 12 include polysulfones, cellulose polymers, polypropylene, polyethylene, polyvinyl chloride, polyvinylidene fluoride, polytetrafluoroethylene, or any other combination thereof.

The fluid permeable layer may be any type of filtration media, including, without limitation, microporous films, ultraporous films, reverse osmosis membranes, micro-perforated films, non-woven webs, woven webs, microporous foams, and the like. Additionally, when using multiple layers of the fluid permeable layer 12, each layer may be the same or different depending on the separation goals. For example, the fluid permeable layer can comprise a porous membrane and a fibrous or non-woven layer.

In general, any suitable technique and apparatus that is useful for preparing fluid permeable layers may be used to manufacture the fluid permeable layer 12. For example, porous membranes and processes for making porous membranes are generally disclosed in U.S. Pat. Nos. 6,284,137-B1, 4,230,463 and 3,615,024 which are incorporated herein by reference. Additionally, the fluid permeable layer may be prepared using a thermally induced phase transition (TIPT) or thermally induced phase separation (TIPS) processes, described in detail in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), and U.S. Pat. No. 5,238,623 (Mrozinski), which are incorporated herein by reference.

Some examples of materials that may be used to form the bonding layer of the support sheet include polyolefin elastomers, ethylene vinyl acetate copolymers, ethylene vinyl acetate terpolymers, styrene-ethylene/butylene-styrene block copolymers, polyurethanes, polybutylene, polybutylene copolymers, polyisoprene, polyisoprene copolymers, acrylate, silicones, natural rubber, polyisobutylene, butyl rubber, and mixtures thereof. Some non-exhaustive examples of materials that may be used to form the support sheet 13 include a polypropylene resin, a polyethylene resin, or any combination thereof.

In general, any suitable technique and apparatus, such as profile extrusion, microreplication, cast and cure methods, or any other techniques suitable for manufacturing fluid delivery layers that are known in the art may be used to prepare the support sheet of the present invention. As an example, corrugation of a flat sheet is a suitable technique for making a support sheet having channels in accordance with the present invention. U.S. Patent Application No. 2002/0154406 A1 (Merrill et al.) describes an exemplary method for corrugating a flat polymer film which would be suitable for preparing corrugated support sheets of the present invention and is hereby incorporated by reference. Other methods of corrugation are possible as well.

Figure 6:
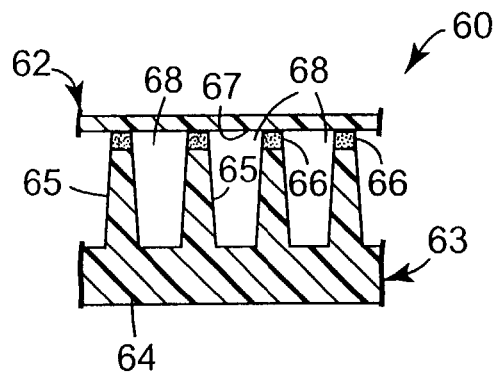
FIG. 6 is a cross-sectional view of an alternate embodiment of the inventive membrane construction illustrating an extruded support sheet with rails and a fluid permeable layer on one side of the support sheet.

When profile extrusion is used to prepare a membrane construction in accordance with the present invention, a multi-layer support sheet can be formed, as best depicted in FIG. 6. The membrane construction 60 includes a fluid permeable layer 62 and a multi-layer support sheet 63. The multi-layer support sheet 63 includes a base 64 and a plurality of spaced-apart substantially parallel rails 65 extending from the base 63. A low-melting resin layer is positioned as a tip 66 at a distal end of the rails 65. Generally, an economical resin, such as a polyolefin resin is co-extruded with the low-melting resin to form the multi-layer support sheet 63.

After co-extrusion, the fluid permeable layer 62 is bonded to the multi-layer support sheet 63 by placing the multi-layer support sheet 63 adjacent to a surface 67 of the fluid permeable layer 62 and applying sufficient heat and pressure to partially or fully melt the low-melting resin to form a thermal bond between the fluid permeable layer 62 and support sheet 63 while avoiding damage to the fluid permeable layer 62 due to excessive heat and/or pressure. Flow channels 68 are defined by adjacent spaced-apart rails and the bonded permeable layer 62.

The low melting resin that is used to form the multi-layer support sheet typically has a lower softening temperature than the surface 67 of the fluid permeable layer 62. Any resin that has a lower softening temperature than the fluid permeable layer 62 is suitable for use so long as a thermal bond between the fluid permeable layer 62 and support sheet 63 is formed without damage to the fluid permeable layer 62.

Some examples of resins that may be used to form the support sheet 63 include polystyrene, polycarbonate, nylons, ABS (acrylonitrotrile-butadiene-styrene), fluoropolymers, or polyolefin resins such as polypropylene, polyethylene, or any combination thereof. Some non-exhaustive examples of low-melting resins which may be used to form tips 66 of multi-layer support sheet 63 include polyolefin elastomers, such as Engage® ultra-low density polyethylene resins that are available from DuPont Dow Elastomers, LLC of Wilmington, Del., and ethylene vinyl acetate copolymers and terpolymers like Elvax® ethylene vinyl acetate copolymer resins that are also available from Dupont Dow Elastomers, LLC of Wilmington, Del. Other non-exhaustive examples include heat sealing resins like styrene-ethylene/butylene-styrene block copolymers, polyurethanes, polybutylene and their copolymers, polyisoprene and their copolymers, acrylate adhesives, silicones, and rubber-based adhesives like natural rubber, polyisoprene, polyisobutylene, butyl rubber or any combination of any of these.

Figure 7:
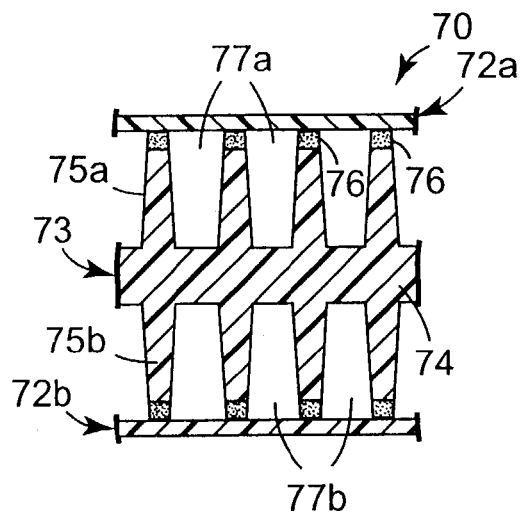
FIG. 7 is a cross-sectional view of an alternate embodiment of the inventive membrane construction illustrating the extruded support sheet with rails and fluid permeable layers on both sides of the support sheet.

Alternatively, a membrane construction 70, as illustrated in FIG. 7, includes first and second fluid permeable layers 72a and 72b bonded to a multi-layer support sheet 73 on opposing sides thereof. The support sheet 73 has a base layer 74 and spaced-apart rails 75a and 75b extending outwardly from the base 74 in opposite directions. Flow channels 77a and 77b are defined by adjacent rails 75a or 75b being bonded to first and second fluid permeable layers 72a and 72b, respectively. The bond between the permeable layers and the rails runs substantially continuously along the length of the rails thereby providing discrete flow channels wherein, if a membrane is punctured along one discrete flow channel, the puncture is localized to that particular flow channel. The membrane construction 70 is advantageous when treating large volumes of water or wastewater because it has an increased membrane surface area.

Figure 8:
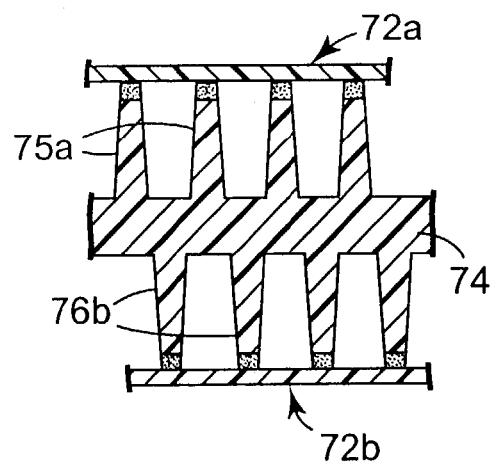
FIG. 8 is a cross-sectional view of an embodiment of the invention in which the rails on one side of the support sheet are offset from the rails on the other side.

The multi-layer support sheet 73 of FIG. 7 includes rails 75a and 75b in an aligned configuration and tips 76 made of low melting polymer (analogous to tips 66 in FIG. 6). Since the support sheet is produced by extrusion techniques, the rails 75a may be positioned in an offset relationship from rails 75b as illustrated in FIG. 8 wherein like reference characters are used to indicate like elements. Additionally, support sheets having varying rail heights and sizes may also be prepared using a different die configuration.

An alternative method which can be used to prepare multi-layer support sheets having linear flow channels, like those depicted in FIGS. 6–8, or tortuous flow channels, like those depicted in FIGS. 5a–5c, is microreplication, comprising the steps of (a) providing a production tool which can be cylindrical and which comprises a plurality of geometric concavities and corresponding peaks on its surface corresponding to the features desired in the support sheet; (b) co-extruding a multi-layer, molten polymer film onto the tool in excess of the amount required to completely fill the cavities, thus substantially filling the cavities, the excess forming a layer of polymer overlying the cavities and the surface around the cavities; (c) cooling the polymer film, allowing it to solidify and preserving a permanent surface texture corresponding to that of the production tool; and (d) continuously stripping from the tool the solidified polymer (see, for example, WO 99/65664 (Bentsen et al.) and U.S. Pat. No. 5,077,870 (Melbye et al.), U.S. Pat. No. 5,679,302 (Miller et al.), and U.S. Pat. No. 5,792,411 (Morris et al.), which are incorporated herein by reference).

When the membrane constructions of the present invention are used to deliver gas, such as in a membrane aerated bioreactor (MABR), modification of the membrane surface may be required. Wastewater typically includes low surface energy fluids such as oil, grease and surfactant-like molecules that can cause membrane wet-out over time. Therefore, reducing membrane wet-out by increasing the resistance of a membrane to absorption of low surface energy fluids like oil or grease over time is desirable so that membrane separation efficiency and life is maximized during wastewater treatment.

One method to increase the resistance of a membrane to absorption or adsorption of oil or grease over time is to reduce surface energy of the fluid permeable layer 12. One way to reduce the surface energy of the fluid permeable layer 12 is to make the fluid permeable layer 12 oleophobic. Generally, the resistance of a surface to wetting by low energy fluids increases as the surface energy of the surface decreases.

Conventional membranes prepared from materials such as Gore-Tex® material available from W.L. Gore & Associates, Inc., typically have surface energies of more than 20 dynes per centimeter. However, to avoid membrane wet-out by low surface energy fluids, the inventive membranes may be prepared to have surface energies of less than about 20 dynes per centimeter.

If the material used to form the fluid permeable layer 12 is not sufficiently oleophobic or the surface energy is not less than about 20 dynes per centimeter, the oleophobicity is generally improved by incorporation of fluorine-containing chemical groups in a near-surface region of the fluid permeable layer 12. Incorporation of fluorine-containing chemical groups in the near-surface region of the fluid permeable layer 12 can be accomplished by any of the following general techniques: (1) incorporation of small-molecule or macromolecular fluorinated additives in the bulk polymer composition used to prepare the fluid permeable layer; (2) coating the finished fluid permeable layer 12 with a composition comprising fluorinated chemical groups; (3) exposure of the fluid permeable layer 12 surface to ionizing radiation or a plasma discharge in the presence of a gaseous fluorinated species; or (4) providing a fluid permeable layer polymer and a polymerizable chemical group comprising fluorine, and initiating the production of reactive groups on either the fluid permeable layer polymer, the polymerizable chemical group, or both to effect polymerization and/or graft polymerization of the polymerizable chemical group on or within the fluid permeable layer polymer in the vicinity of the surface.

Similarly, when the membrane constructions of the present invention are used in water filtration, modification of the membrane to make the membranes more hydrophilic is beneficial. In general, techniques to make membranes more hydrophilic are known in the art.

The membrane constructions of the present invention can be used as part of a membrane module in a fluid filtration system as disclosed in U.S. Pat. No. 5,639,373, U.S. Pat. No. 5,204,001, U.S. Pat. No. 6,406,629-B1, U.S. Pat. No. 5,192,456, U.S. Pat. No. 6,375,848-B1, and U.S. Pat. No. 6,303,035-B1 which are incorporated herein by reference.

The membrane constructions of this invention can be: (1) used in a wastewater treatment or water treatment facility as part of a membrane bioreactor such as membrane bioreactors sold by Zenon Environmental Inc., (Oakville, Ontario, Canada) and Kubota Corporation (Osaka, Japan) as disclosed in U.S. Pat. No. 6,277,209 and U.S. Pat. No. 5,451,317, which are incorporated herein by reference, (2) sparged with air bubbles of varying sizes to reduce biological fouling as disclosed in European Pat. No. 0,510,328-B1, U.S. Pat. No. 6,193,890-B1, U.S. Pat. App. 2001/0047962-A1, U.S. Pat. No. 5,192,456, European. Pat. No. 0,700,713-B1, U.S. Pat. No. 5,451,317, European Pat. App. 0,510,328-A2, U.S. Pat. No. 6,224,766, International Pat. App. WO 00/37369, and U.S. Pat. No. 5,944,997, which are incorporated herein by reference, (3) cleaned using chemicals and/or by backwashing of the membrane constructions as disclosed in U.S. Pat. App. No. 2001/0052494-A1, E.P. 1,166,859-A2, European. Pat. No 0,322,753-B1, which are incorporated herein by reference, and (4) operated with a pressure gradient across the membrane construction either caused by pressure from water outside of a submerged membrane module, a hydrostatic pressure difference, or a vacuum or pressure source connected to a manifold.

A number of factors affect the performance of a submerged membrane filter device, such as the way the membrane modules are mounted in the filtering or bioreactor unit, the spacing of the membrane modules, the pore size, the membrane materials and the operating conditions of the actual filtering or bio-reactor unit. These performance factors are well known in the art and are disclosed in U.S. Pat. No. 5,192,456, and European Pat. App. 0,937,494-A3 which are incorporated herein by reference.

The present invention is more particularly described in the following examples that are intended as illustrations only since numerous modifications and variations within the scope of the present invention will be apparent to those skilled in the art.

EXAMPLE 1

A textured fluid impermeable support sheet having rail-like protrusions on one side was made using conventional profile extrusion equipment. A polypropylene/polyethylene impact copolymer (7C06, 1.5 MFI, Dow Chemical Corp., Midland, Mich.) and a polyolefin elastomer ENGAGE 8100 (Dupont Dow Elastomers, Wilmington, Del.) were coextruded to form a fluid impermeable support sheet having a flat base layer with rail-like protrusions with the upper most surface (tips) of the protrusions containing the low melting point heat sealable elastomer.

The polypropylene copolymer was extruded with a 6.35 cm single screw extruder (24:1 L/D) at a rate of approximately 27 kg/hr using a barrel temperature profile that steadily increased from 177° C. to 232° C. The polyolefin elastomer was fed at a rate of approximately 2.3 kg/hr into a second single screw extruder having a diameter of approximately 3.81 cm (28:1 L/D) and a temperature profile that increased from approximately 204° C. to 232° C. Both polymers were fed into a MASTERFLEX LD-40 film die (Production Components, Eau Claire, Wis.) maintained at a temperature of 232° C. The extrudate was extruded vertically downward through the die equipped with a die lip having a shaping profile. After being shaped by the die lip, the extrudate was quenched in a water tank at a speed of approximately 2.1 meter/min with the water being maintained at approximately 16° C.–20° C. The film die had a die lip having an opening cut by electron discharge machining configured to form a polymeric base sheet having a smooth surface on one side and a textured surface formed of evenly spaced features shaped as rail-like protrusions extending perpendicularly from the base layer on the opposite side. The equipment was configured so that the ENGAGE 8100 elastomer was extruded on the side of the die facing the evenly spaced features.

The base layer of the support sheet had a thickness of about 102 microns (0.004 in) and was composed of the polypropylene copolymer. Each rail-like protrusion extended continuously along the base layer. The dimensions for each rail-like protrusion were approximately 965 microns (0.038 in) in height, a thickness of approximately 406 microns (0.016 in), and a center-to-center spacing of approximately 1016 microns (0.040 in). In addition, each rail-like protrusion had a layer of approximately 127 microns (0.005 in) in thickness of the low melting point ENGAGE 8100 at its distal end (tip). The low melting point resin comprised approximately 7.7% by weight of the multilayer support sheet.

EXAMPLE 2

A first fluid impermeable support sheet having protrusions on one side of the support sheet was extruded using the method of Example 1 and wound into a roll. The first sheet was unwound from a portable unwind station and fed around rollers such that the smooth backside passed approximately 1 centimeter beneath the exit of the die lip. A second fluid impermeable support sheet having protrusions on one side of the support sheet was extruded using the method of Example 1 onto the smooth back-side of the first support sheet such that the resulting dual-layer support sheet had rail-like protrusions on both sides with a base layer thickness of about 305 microns (0.012 in), a rail height of about 965 microns (0.036 in), a rail thickness of about 356 microns (0.014 in), and a rail center-to-center spacing of about 991 microns (0.039 in). The dual-sided support sheet had layers of ENGAGE 8100 resin approximately 127 microns (0.005 in) in thickness on the rail tips on both sides of the base layer.

EXAMPLE 3

The dual-sided fluid impermeable support sheet of Example 2 was thermally laminated to a polypropylene thermally-induced phase separation microporous membrane similar to that described in PCT Publication WO9929220 Example 1. The membrane had a thickness of approximately 76 microns (0.003 in), a bubble point pore diameter of approximately 0.21 microns and an oil content of approximately 35%.

A roll of the dual-sided support sheet was placed on a portable unwind station with an air brake to provide tension. A roll of the microporous membrane was placed on a portable unwind station with an air brake to provide tension to the film.

A series of idler rollers were used to establish a web path such that the microporous membrane and the support sheet made contact at a 2 o'clock position on a 30.5 cm (12 in) diameter chrome plated first nip roll. The nip roll was heated to approximately 74° C. (165° F.). The low melting point resin-containing tips of the rails located on the bottom surface of the support sheet made contact with the microporous membrane with lamination occurring in about 60 degrees of wrap around the heated nip roll.

A second 30.5 cm (12 in) diameter chrome plated nip roll was located directly adjacent to the first nip roll. The second roll was heated to approximately 74° C. (165° F.). Both rolls were nipped together with a pressure of approximately 276 kPa (40 psi), using a gap setting of approximately 254 microns (0.010 in) less than the total thickness of the support sheet.

A second roll of the microporous membrane described above was unwound using a clutch to provide tension and fed into the nip between the two nip rolls such that the tips of the rails located on the top surface of the dual-sided support sheet made contact with the microporous film at approximately the 3 o'clock position of the first nip roll. The three layer laminate construction continued to make contact for approximately 90 degrees of wrap around the second nip roll. A strong bond of the microporous membranes to the dual-sided support structure resulted.

EXAMPLE 4

A textured fluid impermeable support sheet having rail-like protrusions on both sides was made using conventional profile extrusion equipment. A polypropylene/polyethylene impact copolymer (C104, 1.5 MFI, Dow Chemical Corp., Midland, Mich.) and a polyolefin elastomer ENGAGE 8100 (Dupont Dow Elastomers, Wilmington, Del.) were coextruded to form a fluid impermeable support sheet having a flat base layer with rail-like protrusions with the upper most surface (tips) of the protrusions containing the low melting point heat sealable elastomer.

The polypropylene copolymer was extruded with a 6.35 cm single screw extruder (24:1 L/D) at a rate of approximately 26 kg/hr using a barrel temperature profile that steadily increased from 216° C. to 246° C. The polyolefin elastomer was fed at a rate of approximately 1.4 kg/hr into a second single screw extruder having a diameter of approximately 3.81 cm (28:1 L/D) and a temperature profile that increased from approximately 204° C. to 241° C. Both polymers were fed into a 3 layer A-B-A coextrusion feedblock (Cloeren Co., Orange, Tex.) with the polypropylene forming the B layer and the elastomer forming the two A layers. The 3-layer melt stream was fed to an Autoflex 4-H 40 extrusion die (Extrusion Dies, Inc., Chippewa Falls, Wis.) maintained at a temperature of 246° C. The extrudate was extruded vertically downward through the die equipped with a die lip having a shaping profile. After being shaped by the die lip, the extrudate was quenched in a water tank at a speed of approximately 2.1 meter/min with the water being maintained at approximately 16° C.–20° C. The film die had a die lip having an opening cut by electron discharge machining configured to form a central polymeric base sheet having a structured surface formed of evenly spaced linear rail-like protrusions extending perpendicularly from the central base layer on both sides.

The base layer of the support sheet had a thickness of about 165 microns (0.0065 in). The rail-like protrusions were approximately 838 microns (0.033 in) in height, approximately 262 microns (0.0103 in) in thickness or width, and a center-to-center spacing of approximately 1346 microns (0.053 in). In addition, each rail-like protrusion had a layer of approximately 178 microns (0.007 in) in thickness of the low melting point ENGAGE 8100 at its distal end (tip). The low melting point resin comprised approximately 4.9% by weight of the multi-layer support sheet.

EXAMPLE 5

The dual-sided fluid impermeable support sheet of Example 4 was thermally laminated using the procedure in Example 3 above to a polypropylene thermally-induced phase separated microporous membrane similar to that described in PCT Publication WO9929220 Example 1. The microporous membrane comprised approximately 58.75% by mass polypropylene resin (5D45 Union Carbide Corp. Danbury, Conn.), 35.0% by mass mineral oil (White Mineral Oil #31 USP Grade Amoco Oil Company), 4.0% by mass green pigment concentrate containing 25% by mass green #7 pigment (10066064 FDA Green, PolyOne Company), and 2.25% by mass fluorocarbon ester (made by 3M Company and described in U.S. patent application Ser. No. 10/159,752 filed May 29, 2002, page 27 and 28 as citric acid ester FC 425). In summary, toluene, $C_4F_9SO_2N(CH_3)CH_2CH_2OH$ (MeFBSE), citric acid, p-toluene sulfonic acid, and polyethylene alcohol (obtained as Unilin-425 105-OH equivalent weight from Baker Petrolite Corp., Sugar Land, Tex.) were mixed together. The mixture was heated at reflux for 15 hours. When the desired amount of water was collected in the Dean Stark trap (fitted to the reaction flask) the toluene was distilled off. When most of the toluene was distilled off, the molten product was poured into a pan and allowed to dry in an oven at 120° C. for 4 hours.

The structure of FC-425 is

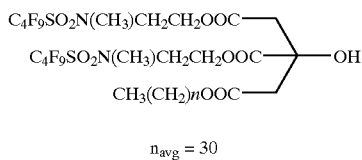

$n_{avg} = 30$

The composition for the microporous membrane was melt mixed at 9.08 kg/hr on a 40 mm co-rotating twin screw extruder having a decreasing barrel temperature profile of 250° C. to 204° C. through a slip gap sheeting die having an orifice 38.1 cm×0.381 mm onto a casting wheel maintained at 60° C. The cast film was stretched in a continuous fashion in the machine direction by a proportion of 1.8:1 at 52° C. and in the cross direction by a proportion of 1.8:1 at 107° C. and heat set at 130° C. The resultant microporous membrane had a surface energy less than 17 dynes/cm.

The membrane had a thickness of approximately 76 microns (0.003 in), a bubble point pore diameter of approximately 0.21 microns and an oil content of approximately 35%.

EXAMPLE 6

The dual-sided fluid impermeable support sheet of Example 4 was thermally laminated using the procedure in Example 3 above to a polypropylene thermally induced phase separated microporous membrane similar to that described in PCT Publication WO9929220 Examples 7–9. 1.5 percent by weight sorbitan monolaurate (SPAN-20, Ruger Chemical Co., Inc., Irvington, N.J.) was added to the melt mixture to render the membrane hydrophilic. The resulting membrane module element comprised microporous membranes on both sides of the multi-layer support sheet, the microporous membranes being hydrophilic and water-permeable.

Although the present invention has been described with reference to the above embodiments, workers skilled in the art will recognize that changes may be made in form and detail without departing from the spirit and scope of the invention.

What is claimed is:
1. A membrane construction comprising:
   a) a multi-layer fluid impermeable support sheet having a plurality of supports on at least one side of the support sheet, said supports forming a plurality of flow channels, at least one layer of the multi-layer sheet being a bonding layer; and
   b) at least one fluid permeable microporous or ultraporous membrane covering a plurality of said flow channels and bonded to a plurality of said supports by means of the bonding layer, said bonding layer comprising a resin layer having a lower softening temperature than the part of the fluid permeable layer that faces away from the bonding layer, such that the support sheet is bonded to the fluid permeable membrane by heat without damaging the structure of the fluid permeable layer of the membrane construction.
2. The membrane construction of claim 1 in which the multi-layer fluid impermeable support sheet is in the form of a corrugated sheet, and the extremities of the corrugations form the supports.
3. The membrane construction of claim 2 wherein the multi-layer fluid impermeable support sheet has a cross-sectional configuration selected from saw tooth and sinusoidal configurations.
4. The membrane construction of claim 1 wherein the supports comprise rails extending from at least one side of the multi-layer fluid impermeable support sheet.
5. The membrane construction of claim 4 having support rails on both sides of the multi-layer fluid impermeable support sheet.
6. The membrane construction of claim 5 wherein the support rails on one side of the multi-layer fluid impermeable support sheet are in an offset relationship with respect to the support rails on the other side.
7. The membrane construction of claim 4 wherein the flow channels are characterized by smaller sub-channels within the channels, said sub-channels being formed by minor protrusions between the supports which minor protrusions do not extend as far from the surface of the multi-layer impermeable support sheet as do the supports.

8. The membrane construction of claim 1 wherein the fluid permeable membrane is a water impermeable, gas permeable microporous membrane.

9. The membrane construction of claim 1 wherein the bonding layer of the multi-layer fluid impermeable support sheet is made of a polymeric material selected from the group consisting of polyolefin elastomers, ethylene vinyl acetate copolymers, ethylene vinyl acetate terpolymers, styrene-ethylene/butylene-styrene block copolymers, polyurethanes, polybutylene, polybutylene copolymers, polyisoprene, polyisoprene copolymers, acrylate, silicones, natural rubber, polyisobutylene, butyl rubber, and mixtures thereof.

10. The membrane construction of claim 1 wherein the bond between at least one fluid permeable membrane and the supports is substantially continuous.

11. The membrane construction of claim 1 further comprising a manifold connected to the flow channels.

12. The membrane construction of claim 1 wherein the hydraulic radius of the flow channels is not constant along the length of the channels.

13. The membrane construction of claim 1 wherein the flow channels define a tortuous path.

14. The membrane construction of claim 1 wherein the fluid permeable membrane comprises a microporous or ultraporous membrane and a fibrous layer.

15. The membrane construction of claim 1 wherein the multi-layer fluid impermeable support sheet comprises a layer, not the bonding layer, which comprises a polypropylene resin, a polyethylene resin, or any combination thereof.

16. The membrane construction of claim 1 in which the fluid permeable membrane comprises a porous material having a pore size of less than about 0.8 micrometers.

17. The membrane construction of claim 1 wherein the fluid permeable membranes have a surface energy of less than about 20 dynes per centimeter.

18. A method of filtering a liquid mixture comprising causing the liquid to pass through the membrane construction of claim 1 by means of a pressure difference from one side of the membrane to the other, the lower pressure being in the flow channels which receive filtrate.

19. A method of transferring gas to a liquid comprising placing the membrane construction of claim 1 in the liquid and causing the gas to flow into the flow channels of the membrane, through the fluid permeable layer and into the liquid.

20. A method of treating water comprising a) placing the membrane construction of claim 1 in contact with the water; b) establishing a mass of bacteria growing on the fluid permeable layer; and c) causing air or oxygen to flow into the flow channels of the membrane, through the fluid permeable layer and into the liquid.

* * * * *